Patented July 11, 1944

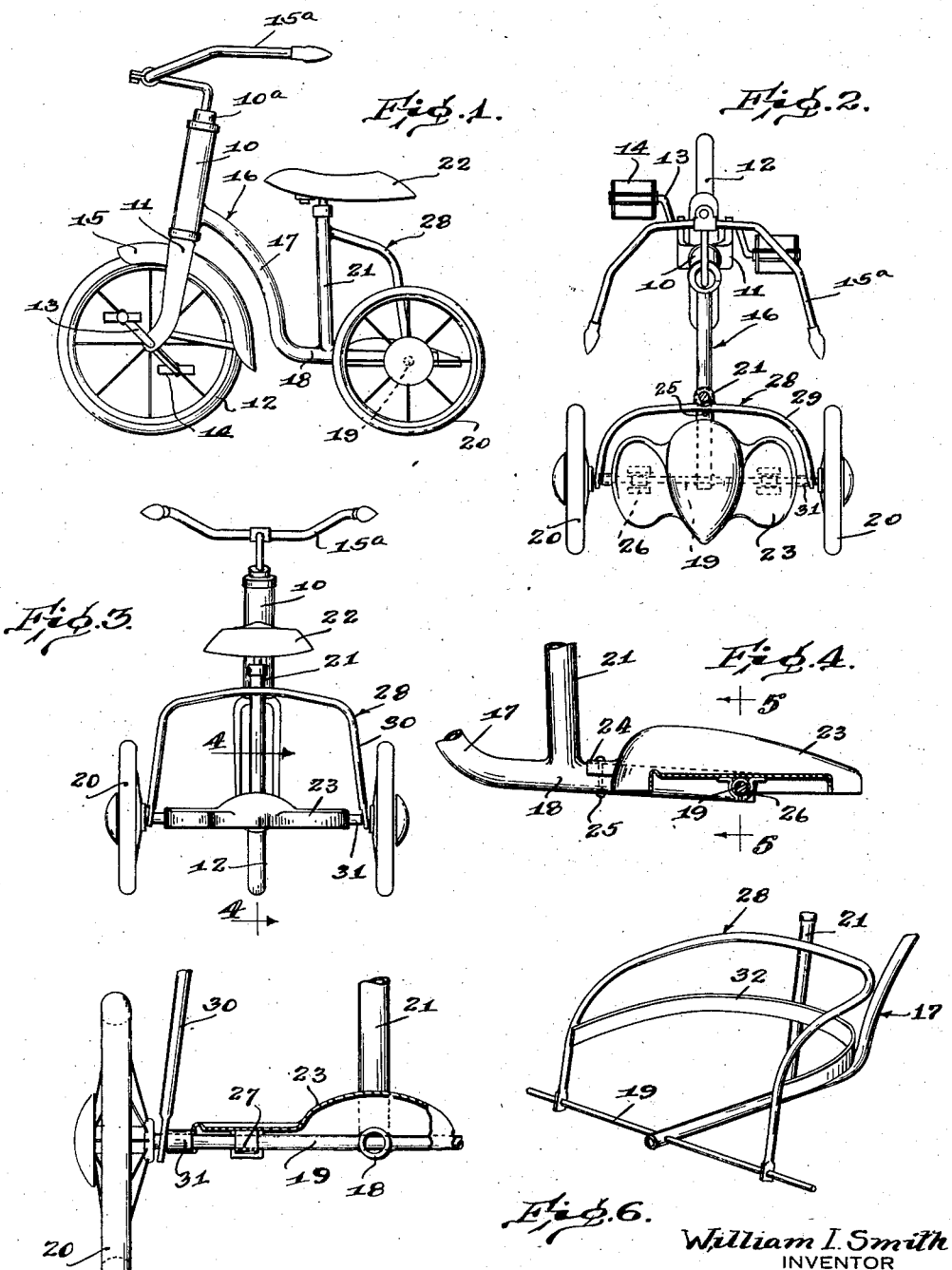

2,353,515

UNITED STATES PATENT OFFICE 2,353,515

VELOCIPEDE

William I. Smith, Goshen, Ind., assignor to The Hettrick Manufacturing Company, Toledo, Ohio, a corporation of Ohio Application December 26, 1941, Serial No. 424,465

5 Claims. (Cl. 280—282)

This invention relates to velocipedes and an object is to produce a new and improved velocipede simulating the well-known English style velocipede but which is less expensive to manufacture.

Another object is to produce a velocipede in which the seat is carried by a vertically disposed post, the lower end of which is disposed substantially in a horizontal plane intersecting the wheel supporting axles, with the view of enhancing the riding qualities of the vehicle.

Another object is to produce a velocipede in the rear end portion of which is a chariot-like structure in which a child may be carried.

Other objects and advantages of the invention reside in details of construction and arrangement and for purposes of illustration but not of limitation, embodiments of the invention are shown in the accompanying drawing in which Figure 1 is a side elevation of a velocipede;

Figure 2 is a top plan view of the velocipede with the saddle seat removed;

Figure 3 is a rear end elevation of the velocipede;

Figure 4 is an enlarged sectional view substantially on the line 4—4 of Figure 3;

Figure 5 is an enlarged fragmentary sectional view on the line 5—5 of Figure 4; and Figure 6 is a rear end elevation of the chariot-like hand hold equipped with a shield member providing a barrier for preventing the child from falling forwardly therethrough.

The illustrated embodiment of the invention comprises a velocipede having a front vertically disposed socket member 10 through which extends a steering post 10a carrying the usual front fork 11 between which is a front wheel 12 fixed to an axle carrying cranks 13 at opposite ends. Pedals 14 are mounted on the extremities of the cranks 13 and provide the means by which the vehicle is propelled. A fender 15 is secured in the usual manner to the fork 11. Handle bars 15 are connected in the usual manner to the steering post 10a.

Fixed as by welding to the lower end portion of the socket member 10 is the backbone 16. The backbone may be of tubular form welded to the socket member 10 and comprises a downwardly and rearwardly curved portion 17 and a rearwardly extending horizontally disposed portion 18. The portion 18 is integrally joined to the portion 17 and is disposed in a horizontal plane which substantially merges with the horizontal plane connecting the front and rear axles. The rear axle 19 is in the form of a rod which extends through aligned apertures in the backbone portion 18 adjacent the free end thereof and is welded in place. Journalled on opposite ends of the axle 18 are wheels 20 which rotate about the axle 19. It will be observed that the axles for the front wheel 12 and rear wheels 20 are in substantially the same horizontal plane.

Fixed as by welding to the rearward portion 18 of the backbone and extending upwardly therefrom is a tubular post 21. As shown the post 21 is disposed just forwardly of the rear wheels 20 and spaced a short distance rearwardly of the lower end of the downwardly and rearwardly curved backbone portion 17. In this instance the post 21 is arranged at substantially right angles to a horizontal line connecting the front and rear axles and mounted on the upper end of the post 21 is a saddle seat 22. It will be manifest that the weight of the child is transmitted through the post 21 to the horizontally disposed backbone portion 18 and to a point in substantially the same horizontal plane as the front and rear axles. This arrangement greatly enhances the riding qualities of the vehicle and is a distinct improvement in this aspect over the conventional velocipede structure.

Mounted over the rear axle 19 is a sheet metal step plate 23 which has a portion 24 extending forwardly and fitting over the backbone portion 18, a rivet 25 securing this portion to the backbone. Depending from the under side of the step plate are pairs of flange portions 26 which are bent about the rear axle 19. In this instance, a sleeve 27 is interposed between the pairs of flanges 26 and the axle 19 to enable the flanges more securely to be clamped in place. As shown on the drawing, a pair of clamping flanges 26 are disposed on opposite sides of the backbone so that the step plate is secured in place at three points.

Secured to the rear side of the post 21 adjacent its upper end is a generally C-shaped combined hand hold and brace 28 which is in the form of a metal rod. The member 28 is preferably welded to the post 21 and on each side of the post the member 28 curves outwardly and rearwardly as indicated at 29 to a point above the rear axle 19 and thence inclines downwardly and outwardly as indicated at 30 on Figure 3. The above described construction obtains on each side of the post 21 and the lower end of each of the arms 30 is apertured to receive the rear axle 19. In this instance a sleeve or bushing 31 is interposed between the arm portion 30 and the adjacent flange side of the step plate 23. From the above it will be apparent that the member 28 provides a hand hold for a child standing on the step plate 23 but it also affords a brace for the seat post 21. The shape of the member 28 is chosen to simulate a Roman chariot and may, therefore, be referred to as a chariot-like structure. The step plate 23 may additionally provide a seat for a child and the chariot-like structure serves as a guard.

If desired, the chariot-like structure 28 may be provided with a shield 32 as indicated on Figure 6 to militate against the child falling forwardly through the open space between the step plate and the chariot-rail. In this instance the shield 32 is shown in the form of a C-shaped strip of metal suitably fixed to the arm portions 30 and the seat post 21.

It is to be understood that numerous changes in details of construction, arrangement and operation may be effected without departing from the spirit of the invention especially as defined in the appended claims.

What I claim is:

1. In a velocipede, a front fork, a wheel carrying axle on the front fork, pedal carrying cranks fixed to said axle, a backbone inclining downwardly and rearwardly from said fork, a wheel carrying rear axle secured to the rearward end portion of said backbone, said rearward end portion being substantially in alignment with said wheel carrying axles, an upright seat post secured at one end to said backbone at a point spaced forwardly from said rear axle and forming substantially a right angle with a horizontal line intersecting said axles, the lower end of said post being substantially in horizontal alignment with said axles, a step plate mounted upon said rear axle, and means providing a hand hold for a child on said step plate, said last means comprising a member fixed to said post and extending rearwardly therefrom.

2. In a velocipede, a front fork, a wheel carrying axle on the front fork, pedal carrying cranks fixed to said axle, a backbone inclining downwardly and rearwardly from said fork, a wheel carrying rear axle secured to the rearward end portion of said backbone, said rearward end portion being substantially in alignment with said wheel carrying axles, an upright seat post secured at one end to said backbone at a point spaced forwardly from said rear axle and forming substantially a right angle with a horizontal line intersecting said axles, the lower end of said post being substantially in horizontal alignment with said axles, a step plate mounted upon said rear axle, and means providing a hand hold for a child on said step plate, said last means comprising a rod fixed to an upper portion of said post and inclining downwardly toward said rear axle.

3. In a velocipede, a front fork, a wheel carrying axle on the front fork, pedal carrying cranks fixed to said axle, a backbone inclining downwardly and rearwardly from said fork, a wheel carrying rear axle secured to the rearward end portion of said backbone, said rearward end portion being substantially in alignment with said wheel carrying axles, an upright seat post secured at one end to said backbone at a point spaced forwardly from said rear axle and forming substantially a right angle with a horizontal line intersecting said axles, the lower end of said post being substantially in horizontal alignment with said axles, a step plate mounted upon said rear axle, and means providing a hand hold for a child on said step plate, said last means comprising a rod fixed to said post and extending laterally on opposite sides thereof and thence downwardly and rearwardly to said rear axle, thereby providing in addition to a hand hold a brace for said post.

4. In a velocipede, a front fork, a wheel carrying axle on the front fork, pedal carrying cranks fixed to said axle, a backbone inclining downwardly and rearwardly from said fork, a wheel carrying rear axle secured to the rearward end portion of said backbone, said rearward end portion being substantially in alignment with said wheel carrying axles, an upright seat post secured at one end to said backbone at a point spaced forwardly from said rear axle and forming substantially a right angle with a horizontal line intersecting said axles, the lower end of said post being substantially in horizontal alignment with said axles, a step plate mounted upon said rear axle, means providing a hand hold for a child on said step plate, said last means comprising a rod fixed to said post and extending laterally on opposite sides thereof and thence downwardly and rearwardly to said rear axle, thereby providing in addition to a hand hold a brace for said post, and shield means cooperating with said rod for preventing a child from falling forwardly through the space below said rod.

5. In a velocipede, a front fork, a backbone inclining downwardly from said fork and terminating in a horizontal portion, a rear axle connected to said horizontal portion, a seat supporting post fixed to said horizontal portion and extending upwardly therefrom, a step plate on said rear axle and in rear of said post, and rod means of generally C-shape mounted on the post and cooperating with said step plate to provide a chariot-like structure.

WILLIAM I. SMITH.